United States Patent
Maguire et al.

(10) Patent No.: US 8,589,193 B2
(45) Date of Patent: *Nov. 19, 2013

(54) SYSTEMS, METHODS, AND MACHINE-READABLE STORAGE MEDIA FOR INTERFACING WITH A COMPUTER FLIGHT SYSTEM

(75) Inventors: Matthew R. Maguire, Cambridge, MA (US); Barry C. Smith, Dallas, TX (US); Ronald J. Dwyer, Denver, NC (US)

(73) Assignee: Primair, Inc., Larkspur, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,167

(22) Filed: Sep. 29, 2011

(65) Prior Publication Data

US 2012/0035966 A1    Feb. 9, 2012

Related U.S. Application Data

(63) Continuation of application No. PCT/US2011/035916, filed on May 11, 2011.

(60) Provisional application No. 61/333,452, filed on May 11, 2010.

(51) Int. Cl.
    *G06Q 50/00*    (2012.01)
    *G06Q 10/00*    (2012.01)

(52) U.S. Cl.
    USPC ............................ 705/5; 705/7.22; 705/7.25

(58) Field of Classification Search
    USPC ................. 705/5, 6, 7.12, 7.22, 7.23, 7.25
    See application file for complete search history.

(56) References Cited

U.S. PATENT DOCUMENTS

| | | | |
|---|---|---|---|
| 6,076,067 | A | 6/2000 | Jacobs et al. |
| 6,263,315 | B1 | 7/2001 | Talluri |
| 7,562,027 | B1 | 7/2009 | Baggett et al. |
| 7,707,056 | B1 | 4/2010 | Anbil et al. |
| 7,769,612 | B1 | 8/2010 | Walker et al. |

(Continued)

FOREIGN PATENT DOCUMENTS

| | | |
|---|---|---|
| JP | 11203369 | 7/1999 |
| JP | 2004355054 | 12/2004 |

(Continued)

OTHER PUBLICATIONS

Wang, et al., Dynamic Yield Management When Aircraft Assignments are Subject to Swap, Transp. Res. Part B 40, 2006, pp. 563-576.*

(Continued)

*Primary Examiner* — Daniel Vetter
(74) *Attorney, Agent, or Firm* — Greenberg Traurig, LLP

(57) ABSTRACT

Provided herein are systems, methods and machine-readable media for interfacing with computer flight systems. For example, one embodiment is described wherein an unknown and/or changing inventory of aircraft, potentially including aircraft owned or operated by third parties, is managed to provide flight schedules, fare structures, and reservation inventories to computer flight systems. Another embodiment is described wherein aircraft inventory is allocated dynamically and/or adjusted in real-time in response to bookings of seats on aircraft flights in the flight schedule. Another embodiment is described wherein aircraft inventory may be changed by suppliers of aircraft, including changes to costs for using a portion of the inventory (e.g., using an aircraft for a day), and a management system may modify booking class inventories on one or more flights in the flight schedule in response.

16 Claims, 7 Drawing Sheets

(56) References Cited

U.S. PATENT DOCUMENTS

| | | | |
|---|---|---|---|
| 2004/0249685 | A1 | 12/2004 | Douglas |
| 2005/0209896 | A1 | 9/2005 | Fauser et al. |
| 2005/0216317 | A1 | 9/2005 | Medellin et al. |
| 2005/0228702 | A1 | 10/2005 | Fairbanks et al. |
| 2005/0246208 | A1 | 11/2005 | Langerman |
| 2006/0022037 | A1 | 2/2006 | Strothmann et al. |
| 2006/0095306 | A1 | 5/2006 | Parker et al. |
| 2007/0143153 | A1 | 6/2007 | Ashby et al. |
| 2007/0143154 | A1 | 6/2007 | Ashby et al. |
| 2007/0214033 | A1 | 9/2007 | Miller |
| 2008/0059273 | A1 | 3/2008 | Miller |
| 2008/0133284 | A1* | 6/2008 | Birch et al. ........... 705/5 |
| 2009/0119135 | A1* | 5/2009 | Schoeman et al. ........... 705/5 |
| 2009/0182588 | A1 | 7/2009 | Ashby et al. |
| 2009/0281844 | A1* | 11/2009 | Probst ........... 705/5 |
| 2011/0166898 | A1* | 7/2011 | Zarrow ........... 705/5 |
| 2012/0035965 | A1 | 2/2012 | Maguire et al. |

FOREIGN PATENT DOCUMENTS

| | | |
|---|---|---|
| KR | 1020090050045 | 5/2009 |
| WO | 2008048029 | 4/2008 |
| WO | 2011143212 | 11/2011 |
| WO | 2011143353 | 11/2011 |

OTHER PUBLICATIONS

Pilla, et al., A Statistical Computer Experiments Approach to Airline Fleet Assignment, Dec. 2005.*

De Boer, The Impact of Dynamic Capacity Management on Airline Seat Inventory Control, J. of Revenue & Pricing Mgmt. vol. 2 No. 4, 2004, pp. 315-330.*

Waldman, A Study of the Practicality and Profit Enhancement Potential of Demand Driven Dispatch in Airline Hub Operations, MIT Thesis, May 1993.*

NATA Empty Leg Information, Jul. 2007.*

International Patent Application No. PCT/US2011/036134, International Search Report and Written Opinion, Dec. 29, 2011.

U.S. Appl. No. 13/248,963, filed Sep. 29, 2011, entitled "Systems, Methods, and Machine-Readable Storage Media for Interfacing With a Computer Flight System."

Berge, et al., "Demand Driven Dispatch: A Method for Dynamic Aircraft Capacity Assignment, Models, and Algorithms", Operations Res., vol. 41, No. 1, Jan.-Feb. 1993, pp. 153-168.

Hansen, "Dynamic Airline Scheduling: Analyses, Enhancements, and Experiments", Thesis, Tech. Univ. of Denmark, Dec. 2006.

Jiang, et al., "Dynamic Air Scheduling", MIT Dept. Civil and Environmental Engineering, Aug. 2006.

Wang, et al., Continuous-Time Dynamic Network Yield Management with Demand Driven Dispatch in the Airline Industry, Transp. Res., Part E 44, 2008, pp. 1052-1073.

Non-Final Office Action, U.S. Appl. No. 13/248,963 mailed Mar. 16, 2012.

International Search Report based on PCT/2011/035916 dated Feb. 29, 2012.

* cited by examiner

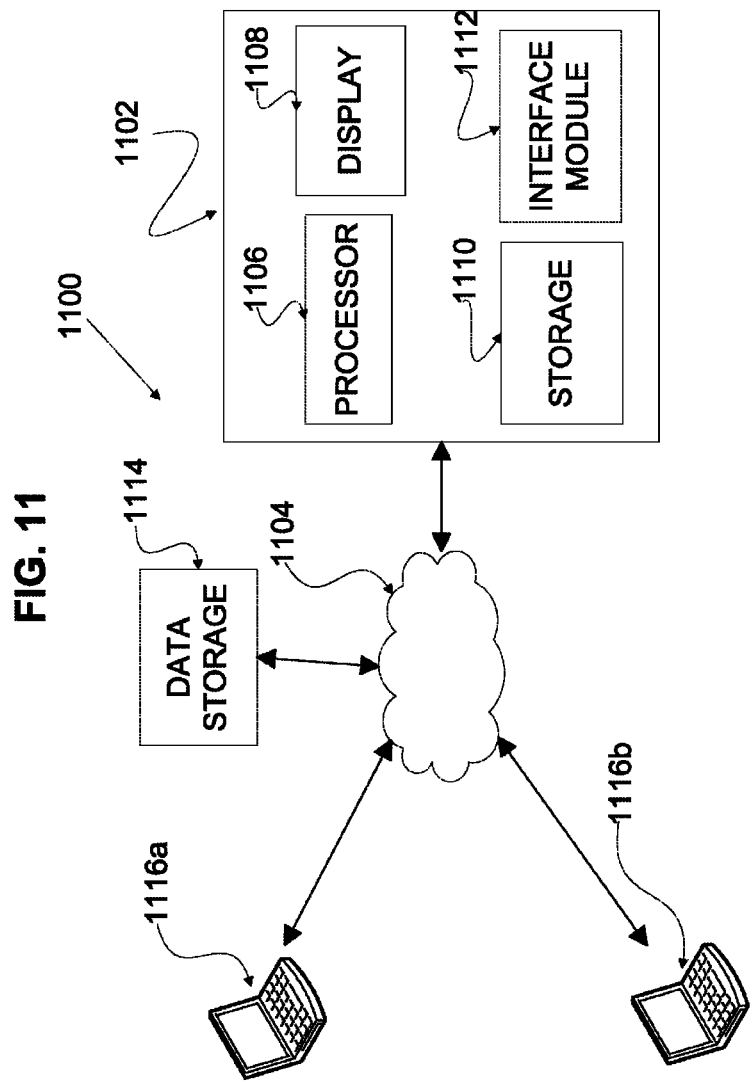

SYSTEMS, METHODS, AND MACHINE-READABLE STORAGE MEDIA FOR INTERFACING WITH A COMPUTER FLIGHT SYSTEM

CROSS-REFERENCE TO RELATED APPLICATIONS

This application is a continuation of International Application No. PCT/US2011/035916, filed May 10, 2011, and entitled "Systems, Methods, and Machine-Readable Storage Media for Interfacing with a Computer Flight System", which itself claims priority to U.S. Provisional Application No. 61/333,452 entitled "System and Method to Schedule and Market Air Transportation Services," by Maguire et al. and filed May 11, 2010. International Application No. PCT/US2011/035916 is hereby incorporated by reference herein in its entirety.

FIELD OF THE TECHNOLOGY

At least some embodiments of this disclosure relate to computer flight systems and interfaces between those systems and computer or information processing systems of other business entities.

BACKGROUND

Computer flight systems provide services for centralized reservations of seats, such as on aircraft flights. Commercial airlines and certain other types of operators have adapted to interface with these computer flight systems, while other types of operators are unable to participate with at least a portion of the functionality of the computer flight system(s).

SUMMARY OF THE DESCRIPTION

Systems, methods and machine-readable storage media for interfacing with computer flight systems in accordance with the present disclosure are described herein. Some embodiments are summarized in this section.

In one embodiment, the disclosure describes a method, which may be implemented on a computer, whereby the method includes receiving an indication of a booking on a first aircraft flight, determining, via a data processing system, that the booking causes a change in a physical capacity of a second aircraft flight that shares no common physical flight leg with the first aircraft flight, and instructing, based on the change in the physical capacity, a computer flight system to update a reservation inventory of the second aircraft flight.

In another embodiment, the disclosure describes a method, which may be implemented on a computer, whereby the method includes receiving an indication of a booking on a first aircraft flight, determining, via a data processing system, that the booking causes a change in availability for an aircraft, and instructing, based on the change in availability, a computer flight system to update a reservation inventory of a second aircraft flight.

In another embodiment, the disclosure describes a method, which may be implemented on a computer, whereby the method includes receiving an indication of a booking on a first aircraft flight, calculating, via a data processing system, a cost to operate a second aircraft flight based on the booking, and instructing, based on the cost, a computer flight system to remove at least one seat from a first booking class inventory for the second aircraft flight and to add at least one seat to a second booking class inventory for the second aircraft flight.

In another embodiment, the disclosure describes a method, which may be implemented on a computer, whereby the method includes creating, via a data processing system, a flight schedule including a plurality of aircraft flights, and sending the flight schedule and a booking class inventory associated with one of the plurality of aircraft flights to a computer flight system. The method further includes, receiving, via the data processing system, information about a cost or an availability of an aircraft, and indicating to the computer flight system, in response to the information, an update to the booking class inventory.

In another embodiment, the disclosure describes a method, which may be implemented on a computer, whereby the method includes tracking, via a data processing system, an aircraft inventory comprising a plurality of aircraft including a first aircraft, maintaining, via the data processing system, a plurality of booking class inventories for a plurality of flights including a first flight, wherein the plurality of booking class inventories includes a first booking class inventory for the first flight and a second booking class inventory for the first flight, and, in response to a bid related to the first aircraft, updating the plurality of booking class inventories by assigning at least one available seat on the first flight from the first booking class inventory to the second booking class inventory.

In another embodiment, the disclosure describes a method, which may be implemented on a computer, whereby the method includes tracking, via a data processing system, an aircraft inventory comprising a plurality of aircraft including a first aircraft, maintaining, via the data processing system, a plurality of booking class inventories for a plurality of flights including a first flight, wherein the plurality of booking class inventories includes a first booking class inventory for the first flight and a second booking class inventory for the first flight, and, in response to an update to cost or availability information related to the first aircraft, updating the plurality of booking class inventories by assigning at least one available seat on the first flight from the first booking class inventory to the second booking class inventory.

In another embodiment, the disclosure describes a data processing system that includes memory for storing an aircraft inventory comprising a plurality of aircraft including a first aircraft, and further storing a plurality of booking class inventories for a plurality of flights including a first flight. The data processing system includes at least one processor coupled to access the memory, the at least one processor configured to perform a method. The method includes tracking the aircraft inventory, maintaining the plurality of booking class inventories for a plurality of flights including the first flight, wherein the plurality of booking class inventories includes a first booking class inventory for the first flight and a second booking class inventory for the first flight, and, in response to a bid related to the first aircraft, updating the plurality of booking class inventories by assigning at least one available seat on the first flight from the first booking class inventory to the second booking class inventory.

In another embodiment, the disclosure describes a method, which may be implemented on a computer, whereby the method includes sending to a computer flight system a flight schedule including a plurality of aircraft flights with a corresponding plurality of booking class inventories, wherein the plurality of aircraft flights share no common physical flight leg with each other, receiving, via a data processing system, an indication of an update to availability or cost for an aircraft related to at least one of the plurality of flights, and maintaining, via the data processing system, the plurality of booking class inventories based on the indication.

In another embodiment, the disclosure describes a method, which may be implemented on a computer, whereby the method includes maintaining, via a data processing system, a pool of provisional flights, receiving a bid or a booking, and, in response to receiving the bid or the booking, modifying at least one booking class inventory for at least one flight in the pool of provisional flights.

In another embodiment, the disclosure describes a method, which may be implemented on a computer, whereby the method includes sending to a computer flight system a flight schedule including a plurality of provisional aircraft flights, and receiving an indication of either a bid for a cost of operating an aircraft related to a first provisional aircraft flight of the plurality of provisional aircraft flights or a booking of a seat on the first provisional aircraft flight. The method further includes maintaining, via a data processing system, a booking class inventory for a second provisional aircraft flight of the plurality of provisional aircraft flights, wherein the maintaining includes sending an indication to the computer flight system to modify the booking class inventory based on the indication.

Other embodiments and features of the present disclosure will be apparent from the accompanying drawings and from the detailed description that follows.

BRIEF DESCRIPTION OF THE DRAWINGS

The embodiments are illustrated by way of example and not limitation in the figures of the accompanying drawings in which like references indicate similar elements.

FIG. 11 is schematic representation of an embodiment of a computer system for interfacing with a computer flight system.

DETAILED DESCRIPTION

Figure 1:
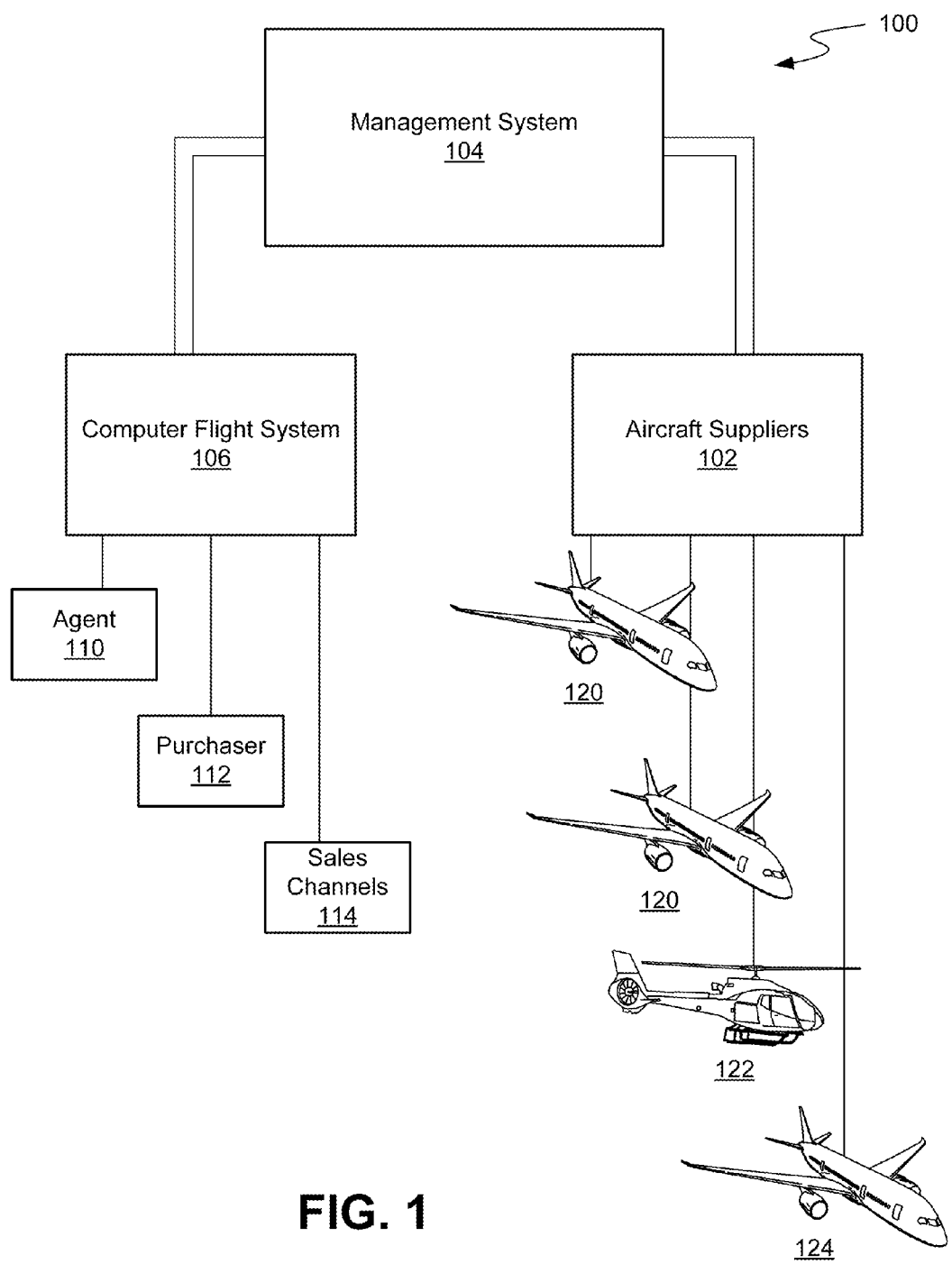
FIG. 1 shows an embodiment of an interface with a computer flight system.

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Provided herein are systems, methods and machine-readable media for interfacing with computer flight systems. For example, one embodiment is described wherein an unknown and/or changing inventory of aircraft, potentially including aircraft owned or operated by third parties, is managed to provide flight schedules, fare structures, and reservation inventories to computer flight systems. Another embodiment is described wherein aircraft inventory is allocated dynamically and/or adjusted in real-time in response to bookings of seats on aircraft flights in the flight schedule. Another embodiment is described wherein aircraft inventory may be changed by suppliers of aircraft, including changes to costs for using a portion of the inventory (e.g., using an aircraft for a day), and a management system may modify booking class inventories on one or more flights in the flight schedule in response. Another embodiment is described that is adapted to mitigate financial risks of operating at least a portion of the flight schedule, including through modifying reservation inventories, modifying booking class inventories, instructing certain aircraft to fly certain flights and/or instructing certain aircraft not to fly certain flights. Another embodiment is described for managing computer flight systems for items other than aircraft flights, such as tickets for bus or train travel.

For example, methods for maintaining relationships between flights and for managing aircraft inventories with respect to those flights, as described further herein, may be used for maintaining relationships between travel on other vehicles or other modes of transport and may be used for managing other transportation vehicle inventories. Similarly, systems and machine-readable media adapted to implement some of the methods described further herein may be applied to interfacing with computer flight systems for other transportation modes, and reservations may be booked that need not necessarily relate to seats on these transportation modes. For example, reservations for rooms and/or cargo areas for lading on a ship may be booked as described further herein. Some examples of vehicles and other transportation modes include automobiles, taxis, buses, trains, ships, ferries, and shuttle services. As described herein, booking class inventories are discussed with respect to aircraft flights, but that other types of reservation classifications may be used for other forms of transport.

Computer flight systems include flight publishing systems, computer reservations systems known as "CRS", and global distribution systems known as "GDS", such as Sabre. These computer flight systems may publish flight information and/or make available bookings of seats on behalf of operators of the flights (e.g., commercial airlines). Users of a computer flight system view the details of the flights and the users may include several industry entities such as individual purchasers, potential passengers, corporate or volume purchasers, travel agents, reservation assistants, and automated systems. Each user may interact with the computer flight system to search for aircraft flights within the flight schedule matching certain criteria (e.g., origin/destination pair, time of flight) and having available seats in one or more booking class inventories, as listed under certain booking class codes. Systems, methods and machine-readable media described herein may communicate with a computer flight system directly or indirectly, such as through communications conduits and/or intermediate systems that, in turn, communicate with the computer flight system.

FIG. 1 shows an embodiment of an interface 100 with a computer flight system 106. The interface 100 includes a management system 104 that communicates with one or more aircraft suppliers 102 to provide data to the computer flight system 106. The interface 100 as shown includes a schematic representations of communications channels (e.g., connecting management system 104 with computer flight system 106) which may be implemented as a distributed system and/or connected in multiple different manners. Each of the communications channels between the management system 104, the aircraft suppliers 102, and the computer flight system 106 may be electronic communications channels, such as computer networks. For example, the communications between the management system 104 and the computer flight system 106 may utilize computer networks, including several types of networks, processors and/or data storage devices. Thus, embodiments of the disclosure are not limited to a particular architecture. In some embodiments, a client-server architecture, a peer-to-peer architecture, or some combination thereof can be used, in which one or more centralized servers may be used to provide some of the information and/or services and the peer to peer network may be used to provide other information and/or services. For example, a centralized server can be used to receive and/or aggregate data from suppliers 102, while processing may be performed by computer(s) operating as a client.

In one embodiment, the computer flight system 106 may expect that management system 104 is a typical provider of data, such as a scheduled air carrier or commercial airline, and may only accept certain input data types. For example, computer flight systems 106 may provide certain rules about how information from providers of flights, such as commercial airlines, charter operations operators, or others must be formatted for acceptance by the computer flight system. Some standard input data include a flight schedule, a fare structure, a reservation inventory of available seats in one or more booking classes associated with flights in the flight schedule wherein those available seats are offered for booking through class codes recognized by the computer flight system. The computer flight system 106 may provide information about bookings made on flights to outside entities, and a management system 104 may receive this information from the computer flight system, such as over a network. Information received may take several forms, such as an indication of a booking, or indirect information from which a booking may be inferred.

One exemplary set of input data includes a flight schedule of future flights. A flight schedule may include aspects of future flights such as origin and destination locations (e.g., airports), dates of aircraft flights, times of aircraft flights, aircraft type, aircraft configuration, passenger terminal, in-flight service, reservation booking designators, and/or traffic restriction codes. Flight schedules may include some of these data and may omit other data. In some embodiments, the flight schedule may be formatted in a manner similar or identical to formatting for a computer flight system 106. For example, the flight schedule may be formatted similarly or so as to be compatible with a computer flight system 106 (e.g., a CRS system). In some embodiments, a flight schedule may be transmitted to a computer flight system 106 and later retrieved by the management system 104 to confirm that the management system has a consistent copy of the flight schedule.

Another exemplary set of input data includes a fare structure including fares, booking class codes, and/or restrictions for seats on aircraft flights and/or itineraries. For example, a fare structure may include multiple fares relating to multiple booking classes of tickets for an aircraft flight. In one embodiment, a fare structure includes at least two classes of tickets and an associated fare for each class of ticket. As described further herein, multiple booking classes may be used to adjust the fare or the selling price for booking an available seat on an aircraft flight, such as selecting a fare based on a cost for operating the aircraft flight.

Another exemplary set of input data includes a reservation inventory for a flight represented by a number of booking classes for the flight and a number of seats available on the flight for each booking class. A booking class inventory is a set of seats that are available in a single booking class and a reservation inventory for a flight is a collection of one or more booking class inventories for that flight. For example, a reservation inventory for a flight may include five booking class inventories for that flight. Available seats on a flight may be offered for bookings through these one or more booking class inventories, with each booking class inventory indicating an availability of seats for that booking class. In some instances, one booking class on a particular flight may have no available seats, and therefore may have a booking class inventory of zero seats, whereas a different booking class on the same flight may have several available seats offered for bookings and a positive booking class inventory. As described further herein, a booking class inventory may be updated to add or remove an available seat for a flight, and the reservation inventory for that flight may be increased or reduced, respectively, by that one available seat. For example, four available seats may be added to one booking class inventory for a flight, twelve available seats may be added to a second booking class inventory for the flight, and the reservation inventory for the flight may thereby be increased by sixteen available seats. As another example, also described further herein, an available seat may be removed from one booking class inventory of a flight and may be added to another booking class inventory of the flight, thereby modifying the reservation inventory and the two booking class inventories, while leaving unchanged the total number of available seats for the flight.

In one embodiment, a flight may have available seats in only one booking class inventory of several booking class inventories, each corresponding to a fare associated with costs of serving the first booking (e.g., a first booking of one or more seats) on the flight or a subsequently-booked seat on the flight. For example, a flight may have 25 available seats, and all may be part of a single booking class inventory before a first booking is received for the flight. After the first booking is received, as described further herein, all of the remaining available seats are removed from the single booking class inventory and are allocated to another booking class inventory. In another embodiment, a flight may have available seats in more than one booking class inventory simultaneously.

A purchaser 112, an agent 110 (e.g., someone purchasing a ticket on behalf of a passenger), or other sales channels 114 may be offered bookings for the entire reservation inventory (e.g., all booking classes that have available seats) for the aircraft flight. For example, a reservation inventory may include available seats in only one booking class at any time, resulting in a ticket being offered for sale at only one fare at a time. Such fares may be described in an associated fare structure. In one embodiment, different booking classes will represent different levels of service as perceived by the passenger, such as, for example, a difference in seating space. In another embodiment, different booking classes may represent a non-stop routing, a single-stop routing, or a multiple-stop routing (e.g., associated with multiple different flight numbers). In another embodiment, different booking classes represent similar or the same level of service as perceived by the passenger.

The computer flight system 106 may maintain the reservation inventory through modifying a booking class inventory based on instructions from users of the system, such as to reserve an available seat. In one embodiment, as described further herein, one or more booking class inventories may be modified by the management system 104. For example, a management system 104 may wish to update the available seats in a booking class inventory as published by the computer flight system 106, such as in response to a booking of a seat, or in response to the management system determining a new cost associated with the flight, as described further herein. For example, the management system 104 may receive an indication that an available seat has been booked (e.g., a notice from the computer flight system 106), and the management system may determine that one or more adjustments should be made to one or more booking class inventories based on that indication. As described further herein, the management system 104 may responsively send an instruction to the computer flight system 106 to modify the number of available seats within a booking class inventory that is published by the computer flight system.

The system includes suppliers 102 of aircraft, such as jets 120, 124, turbo-props, or helicopters 122. In general, suppliers 102 include any entity that controls or manages one or more aircraft, such as a jet 120. For example, a supplier 102 may own, lease or otherwise have control sufficient to schedule the use of the aircraft. A supplier 102 may be an aircraft charter operation operator and may operate through selling individual days of use of an aircraft, such as jet 124 from a particular origin. A supplier 102 may operate through leasing or selling other portions or uses of its aircraft inventory. For example, a supplier may lease or sell use of an aircraft by the hour, by the distance travelled, and/or by the number of flights or flight-legs travelled. In one embodiment, a supplier 102 may use the management system 104 to manage the use of the supplier's own aircraft.

In one embodiment, a supplier 102 of aircraft may control a single inventory of aircraft, such as jets 120 and helicopter 122. For example, a supplier 102 may own aircraft and may not control any other aircraft. In another embodiment, a supplier 102 may own aircraft and transact (e.g., lease, partially own) other aircraft such that the supplier manages more than one inventory. For example, a first supplier 102 may have another jet 124, for which a day of use is transacted (e.g., sold) to a second supplier 102, thereby creating a combined inventory for the second supplier that also contains the jet 124.

Suppliers 102 may provide use of their aircraft to the management system 104 in exchange for fees. For example, a supplier 102 may offer the use of an aircraft for a day, starting at an originating location for a fee, a fee which may be the same as or different from a fee charged for another sale of a day's use of the aircraft (e.g., a charter sale). In one embodiment, the supplier 102 may enter into a contract with the management system 104 that allows the management system to control the use of the aircraft (e.g., jet 124) for a day starting at an originating airport. The contract may be formed such that the management system 104 may execute and/or enforce the contract (e.g., to commit an airplane to fly a certain aircraft flight). For example, the contract may be executed by the management system 104 in response to certain information received, such as a booking of a seat on a flight or a change of status of a flight, as described further herein. These and other occurrences or information may trigger a contract to form, be executed, and/or become enforceable.

Contracts between the management system 104 and various suppliers 102 may set forth rules regarding how a supplier may offer to the management system a bid (e.g., for a cost to the management system) for using an available aircraft, such as for the day. This bid will be any indication sufficient to inform the management system 104 of a cost for the use of an available aircraft under certain restrictions. For example, a bid may be an indication of a price that the supplier 102 is willing to receive, at least at the present time, to cause an available aircraft (e.g., an airplane) to be operated under the direction of the management system 104. Relationships and/or contracts between the management system 104 and various suppliers of aircraft 102 may differ from supplier to supplier.

In addition to presenting the management system 104 with bids for aircraft, the supplier 102 may provide availability parameters as part of the bid. In one embodiment, a bid from a supplier 102 may be for one aircraft with certain constraints on its use. In another embodiment, a bid from a supplier 102 may be for multiple aircraft. For example, a bid may be for a single unit or grouping of multiple aircraft. As another example, a bid may be for individual aircraft with a certain maximum number of aircraft available. As another example, a bid may be for individual aircraft, and the bid may be conditioned on a certain minimum number of aircraft used and a maximum number of aircraft available. In one embodiment, a bid may contain certain conditions. In another embodiment, a bid may have different prices based on whether a condition is met or is not met. For example, a bid may contain a price for use of an aircraft if a certain number of aircraft are used and a price for use of an aircraft if that number (e.g., or a lesser number) are used. In one embodiment, the management system 104 may receive from a supplier 102 an indication of a maximum financial risk related to the supplier's bids. For example, a supplier 102 may indicate a certain total value of commitments that the supplier is willing to have outstanding to the management system 104 at any one time. For example, a supplier 102 may wish to limit the total dollar value of committed aircraft to one hundred thousand dollars, such as may be reached when the management system 104 accepts five bids with a total value of one hundred thousand dollars. In one embodiment, the supplier 102 may indicate certain conditions on a total value amount, such as a maximum financial risk for bids accepted for operations during a certain timeframe. For example, a supplier 102 may indicate that bids accepted by the management system 104 that commit aircraft of the supplier to fly may not exceed two million dollars for a given time period of commitments, such as two million dollars per month. In one embodiment, an indication of maximum financial risk is a condition on the supplier's bid, as described further herein, such that the bid may only be accepted by the management system 104 (e.g., and the aircraft committed to fly) if doing so does not exceed the maximum financial risk indicated by the supplier 102.

The management system 104 may establish with particular rules or operating parameters as to when bids and/or availability of aircraft may be changed by the suppliers 102. In one embodiment, the management system 104 may only accept bid updates and/or availability updates that meet these criteria. In another embodiment, the management system 104 may accept a bid update and/or an availability update within certain parameters without a fee or with a lower fee and may accept the same update outside those parameters for a fee or a larger fee.

In one embodiment, a bid may include availability information for an aircraft and may be combined with cost of using the aircraft. For example, the combination may include a contingent availability based on a certain associated cost or range of costs. A combination of availability and cost may include a temporal component, such that availability may be offered at a first price, but eventually accepted at another price. As another example, a bid may be in the form of an auction bid. In another embodiment, a bid may include a range of costs offered to the management system 104 or a best offer.

In some embodiments, the supplier 102 may be the same entity or a portion of the entity that operates the management system 104. For example, the management system 104 may have a subsidiary or related company that owns, leases or manages the aircraft. Bids for aircraft between related companies may appear in formats specific to the particular relationship between the supplier 102 and the entity operating the management system 104. For example, the management system 104 may register a bid from a supplier 102 that is independent from the operator of the management system in a format of monetary exchange, e.g., currency or credits. As another example, a management system 104 that is operated by an entity related to the supplier 102 (e.g., related company, subsidiary, business division) may rely on an internally-recognized format for accepting the bid.

A bid may be associated with any number of constraints set forth by the supplier 102, requested by the management system 104 (e.g., through a request), and/or agreed upon by the management system and the supplier (e.g., in a contract). For example, a bid may relate to a particular date which the aircraft will be used, such as a cost to use the aircraft on that date. As another example, a bid may relate to a particular aircraft with a certain capacity or number of available seats, and with particular operating requirements (e.g., crew fatigue, work rules, operating time). As another example, a bid may relate to a location or locations that the aircraft may originate from. In one embodiment, a bid may have a range of constraint(s), such as a date range or a range of aircraft/capacities. In another embodiment, a bid may relate only to a single aircraft, a single date, and/or a single originating location. For example, the management system 104 may require that bids relate only to a specific aircraft, but may allow ranges of dates and/or multiple possible originating locations. As other examples, constraints on a bid may include operating airport, aircraft capacity, length of crew duty day, outstanding financial balance, number of weekly operations in a city pair.

The management system 104 receives bids from one or more suppliers 102 and processes these bids, as described further herein. For example, the management system 104 may compare bids for aircraft with similar constraints (e.g., same date, same originating location) and/or aircraft that can operate similar or the same flights in a flight schedule. In one embodiment, a management system 104 may compare the bids (e.g., costs to the management system) to use two different aircraft (e.g., from different suppliers 102 or from the same supplier) for similar or the same flights. For example, an aircraft may have particular constraints, which may be physical constraints or imposed by the supplier 102, that allows the aircraft to fly certain flights of a flight schedule but not others. The management system 104 may compare only those bids that relate to aircraft that share those certain flights of the flight schedule. In another embodiment, a management system 104 may compare dissimilar bids from a supplier 102 with those from another supplier, such as where some or all of the bids compared relate to aircraft able to fly flights that have little or no overlap between them. For example, the management system 104 may compare bids for aircraft that service different flights where such comparison is appropriate.

In one embodiment, an agreement may exist between the operator of the management system 104 and the supplier 102 and a bid submitted by the supplier to the management system incorporates one or more portions of the agreement. For example, a bid may implicitly refer to an agreement with the supplier 102 that submits the bid and/or may incorporate by reference terms from that agreement. For example, a bid may contain only a price, but may be interpreted by the management system as stating that, at that price, the supplier 102 is offering the use of an aircraft under the terms of the agreement with the operator of the management system 104 given certain conditions (e.g., aircraft type, date, originating airport).

In some embodiments, the management system 104 may compare present bids with previous or historical bids for aircraft. For example, present bids for aircraft may be compared to historical bids for aircraft flying similar or the same flights. As another example, present bids for aircraft may be compared to historical bids for aircraft flying partially overlapping and/or completely distinct flights. As another example, historical bids for aircraft may be selected by the management system 104 and used to create a representative bid (e.g., average) for a particular unit of aircraft (e.g., an average bid for a day's use from a Boston-area airport). In some embodiments, the management system 104 may compare a combination of different types of bids and metrics to a present bid. For example, any type of determinations made in generating fare structures, as described further herein, may be used in comparing or evaluating present bids.

As described further herein, the management system 104 may process, compare and/or analyze bids with respect to each other. The management system 104 may use availability of aircraft reflected by and associated with the bids to create a virtual inventory of the aircraft. The virtual inventory may be virtual in several respects. In one embodiment, the virtual inventory of aircraft includes aircraft that have been offered to be available on a certain date, but not committed to fly flights on that date until a later time, if at all. In another embodiment, the virtual inventory of aircraft may be controlled by a supplier 102 (e.g., through an update to availability) at any time before the aircraft is committed to fly on a particular date. For example, as described further herein, a supplier 102 may modify the availability of an aircraft based on rules of the management system 104 and/or based on a contract between the management system and the supplier. Several suppliers 102, with potentially overlapping availability of aircraft (e.g., availability on the same date, availability at the same originating location), may provide the management system 104 with a virtual inventory of aircraft.

The management system 104 may use a virtual inventory of aircraft to create a reservation inventory for flights in a flight schedule. As described further herein, based on availability and bid information from supplier(s) 102, the management system 104 may provide a certain reservation inventory with available seats in one or more booking classes to the computer flight system 106 for flights in the flight schedule. Also as described further herein, based on determinations made with respect to the virtual inventory and/or various analyses, the management system 104 may adjust booking class inventories with the computer flight system 106 for one or more flights in order to limit risk and maximize expected and/or known profitability. In one embodiment, the logic and/or processors included in a management system 104 may be co-located or shared with the computer flight system 106. In another embodiment, a management system 104 may be located separately and may transmit information (e.g., an instruction) to the computer flight system 106. For example, information from the management system 104 may cause the computer flight system 106 to adjust a stored value, such as a booking class inventory, as described further herein.

In one embodiment, described further herein, a flight schedule may be created and a fare structure may be created before aircraft are known by the management system 104 to be available to fly flights of the flight schedule. For example, before aircraft are identified by suppliers 102 as available to fly flights on the flight schedule, the management system 104 may create the flight schedule and an associated fare structure and provide both to the computer flight system 106. As another example, a flight schedule may be created based on previous or anticipated demand. As another example, a fare structure may be created based on historical data, rather than any present bids. As another example, a flight schedule and/or a fare structure may be created based on current contracts with suppliers and potential aircraft that may be available in the future.

In one embodiment, described further herein, an available seat may be allocated to a booking class inventory based on an initial bid relating to an aircraft available to fly a flight. For example, a flight schedule including the flight may be sent to a computer flight system 106 without available seats for some or all of the flights. The management system 104 may receive a bid with associated availability information for an aircraft and, based on that bid/availability information, the management system may cause (e.g., send an update instruction to) the computer flight system 106 to update one or more booking class inventories for one or more of the flights. In one embodiment, the number of available seats in a reservation inventory (e.g., the total number of available seats in all booking classes) on a flight is equal to a number of available seats on a single aircraft available to fly the flight. For example, if only one aircraft is available to fly either of two flights and has 50 available seats, then the reservation inventory will be published as 50 for each flight. As another example, if a first aircraft available to fly a flight has 50 available seats and a second aircraft available to fly a flight has 75 seats, then the reservation inventory will be published as 75. In one embodiment, if a plurality of aircraft are each available to fly one or more flights, a certain aircraft is selected by the management system 104 as a primary option for flying the plurality of flights, and the available seats or the unused physical capacity for the primary option aircraft will be used as the total reservation inventory. For example, if a first aircraft available to fly a flight has 50 available seats and is chosen as the primary option for flying the flight, even though a second aircraft available to fly the flight has 75 seats, then the reservation inventory will be published as 50. In some embodiments, the reservation inventories for a plurality of flights may be related to the physical capacity (e.g., total seating capacity) for multiple aircraft for which bids have been received and are available to fly those flights. For example, if the total physical capacity of an aircraft inventory capable of flying a plurality of flights is equal to 200 seats, such as with two aircraft each with 100 available seats, then 200 seats may be allocated to the reservation inventories for each of the plurality of flights. As described further herein, booking class inventories may be modified by a management system in response to bookings and/or determinations made with respect to costs for the flight.

The management system 104 may update certain information submitted to the computer flight system 106 based on rules and/or contract(s) with the computer flight system. In one embodiment, the computer flight system 106 establishes the same or similar rules for each submitting entity, such as the management system 104, or other entities submitting flight schedules, fare structures, reservation inventories, and/or booking classes. For example, other submitting entities may include scheduled air carriers. In another embodiment, the computer flight system 106 may establish distinct rules for the management system 104 to update information it has submitted to the computer flight system. For example, the computer flight system 106 may allow updates to a flight schedule of future flights only certain times during each week. As another example, the computer flight system 106 may allow updates to a flight schedule of future flights at regular intervals throughout a day. As another example, the computer flight system 106 may allow updates to a booking class inventory immediately and in real-time. As another example, the computer flight system 106 may allow updates to a fare structure only at certain times during the day.

Figure 2:
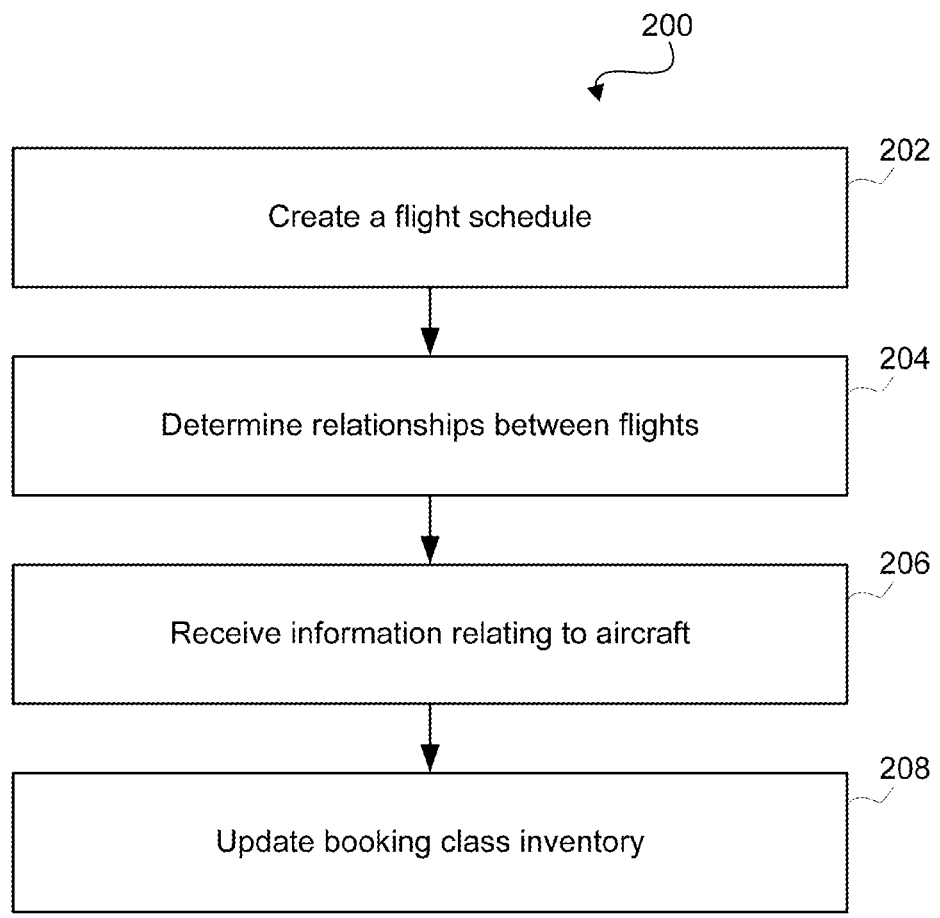
FIG. 2 illustrates an embodiment of a method for interfacing with a computer flight system through updating a booking class inventory with the computer flight system.

FIG. 2 illustrates an embodiment of a method 200 for interfacing with a computer flight system through updating a booking class inventory with the computer flight system. The method includes creating a flight schedule in step 202, determining relationships between the flights in step 204, receiving information relating to an aircraft in step 206, and updating a booking class inventory in step 208.

The method 200 includes creating a flight schedule in step 202. A flight schedule may include more flights than could be served by an inventory of aircraft that are available and/or have received bids for operating. For example, the number of aircraft available to originate from an airport may be physically unable to fly each of the flights on the flight schedule that originate from that airport. The number of aircraft available to originate from a particular location may include a number of aircraft resident at the location, a number of aircraft available to fly from the location on a particular date, and/or a number of aircraft that are committed to fly to the location in sufficient time to operate another later flight leaving from the location. As described further herein, an inventory of aircraft may not be sufficient to fly each of the flights in the flight schedule, particularly if portions of the inventory are virtual or changing. For example, an aircraft inventory may be subject to some condition (e.g., on accepting a bid) and/or aircraft may be removed from availability (e.g., based on a booking, based on a supplier's actions).

A flight schedule may be created in step 202 based on historical data, present market conditions, and/or other factors. For example, passengers may commit to flights or a block of seats on a flight before a flight schedule is created in step 202. As another example, flights with historically popular origin/destination pairs and flight times may be included in the flight schedule. These and other data may be used to create a flight schedule in step 202. However, as described further herein, aircraft inventory need not be known or guaranteed to be available before the flight schedule is created in step 202. As described further herein, the flight schedule may be sent to a computer flight system after it is created in step 202.

The method 200 includes determining relationships between flights in step 204. When a flight schedule is presented (e.g., sent) to a computer flight system, the flight schedule may be interpreted by the computer flight system to include only independent flights. Independent flights may be operated without any requirement or dependency on another of the independent flights operating or not operating. For example, a flight schedule may be populated with independent flights that each may be flown without a requirement that any other flight in the flight schedule is flown or not flown. In step 204, a system operating the method, such as a computer system described further herein, determines one or more relationships between flights in a flight schedule. For example, a management system may establish dependencies between flights, risk and benefit relationships between flights, or other relationships between flights. In one embodiment, a relationship is determined in step 204 that if a first flight is committed to be flown, then a second flight may not be flown. For example, such a relationship may be determined in step 204 based on a limited inventory of aircraft to fly the first and second flights. In another embodiment, a relationship is determined in step 204 that if a first flight is flown non-stop, a second flight must be flown with one stop. In one embodiment, determining a relationship in step 204 may include determining how one flight is affected by a bid for an aircraft on another flight, a booking on another flight, or a change in availability for an aircraft flying another flight. For example, a booking may affect or change an availability for an aircraft, such as through commitment of the aircraft to fly a particular flight or through making the aircraft available to fly the particular flight. That availability change may, in turn, be determined to affect the allocation of other aircraft and/or costs associated with aircraft allocations, such as through different costs to operate different aircraft (e.g., costs from suppliers for using aircraft). As another example, a booking on one flight may affect a physical capacity of another flight, such as through commitment of an aircraft and/or reallocation of an aircraft between flights. For example, an aircraft may be assigned to a particular flight (e.g., through commitment to fly the flight, through being selected as a primary aircraft for that flight before a booking is received) based on a booking for another flight due to one or several factors described further herein, such as cost of operating an aircraft, financial risk (e.g., for a supplier, for an entity operating a management system) involved with committing an aircraft, and/or restrictions on an aircraft for flying the one or more flights. Other relationships between flights, how those relationships may change, and responsive steps with respect to reservation inventories for those flights are described further herein.

The method 200 includes receiving information about an aircraft in step 206. The information received in step 206 may be received from any source, including external sources, sources from within a management system, sources associated with third parties, and sources related to a management system, as described further herein. For example, a management system may receive information about the aircraft in step 206 from a portion of the management system (e.g., a memory) or another related system or entity. As another example, a management system may receive information about the aircraft in step 206 from a supplier or an outside source, as described further herein. The information received in step 206 may include information about a bid, availability information, seating capacity or other constraints on an aircraft's service, or other information that relates to an aircraft's ability to fly flights in the flight schedule or costs for the aircraft to fly those flights. For example, a supplier may send a bid for the use of an aircraft and/or may send an update for a bid to a management system, and that bid or update may be received in step 206. As another example, a supplier may send availability information and/or may update availability information previously sent to a management system, and that information may be received in step 206. Information may be received in step 206 in any of several ways, including through electronic transmission, or through another indication that is received.

Allocating an available seat to a booking class inventory may be based on information received about an aircraft in step 206. For example, a particular booking class inventory may be allocated one or more available seats based on information about bids and availability of aircraft. In one embodiment, bids are compared, costs are calculated, committed and/or potential revenues are calculated, and booking class inventories are allocated seats to maximize profitability of the proposed flight. As described further herein, there may be several booking classes for a flight, and one or more booking class inventories may have zero available seats. As described further herein, fare structures may be created with a fare for each of several booking classes on a flight and available seats may be assigned to one or more booking class inventories based on a selection of a fare associated with that booking class. Also as described further herein, the fare may be selected to match or approximate a revenue target for a booking (e.g., including one or more seats) on the flight, and the revenue target may be based on a number of factors.

The method 200 includes updating a booking class inventory in step 208. A booking class inventory may be updated in step 208 through adding or removing one or more available seats to/from a booking class inventory. In one embodiment, an available seat is removed from one booking class inventory and added to another booking class inventory for the same flight, thereby changing the fare at which the seat is offered. In another embodiment, all available seats from one booking class inventory may be moved from that booking class inventory and added to another booking class inventory, thereby closing sales of seats in one booking class and opening sales of seats in another booking class. As one example, only one booking class inventory for a flight may have available seats at any one time. For example, changing the available seats for a flight from one booking class inventory to another booking class inventory may change the fare at which any seat is available for a particular flight. In another embodiment, one or more available seats may be removed from the reservation inventory of a flight and available seats may be added to the reservation inventory of another flight, such as based on a bid or a booking, as described further herein. For example, all available seats may be removed from one reservation inventory for a flight and, in some cases, as described further herein, some or all of the removed available seats may be added to the reservation inventory of another flight.

Updating the booking class inventory in step 208 may be performed based on relationships between flights as determined in step 204. In one embodiment, a booking class inventory may be updated in step 208 if an aircraft is committed to fly a first flight that is related to a second flight. For example, an aircraft may be committed to fly a particular flight based on a booking of a seat on the first flight and the aircraft may therefore be unable to fly a second flight. The method 200 may responsively update one or more booking class inventories in step 208 so that there are zero available seats for each booking class in the reservation inventory for the second flight, for example if there is no other available aircraft to fly the second flight.

In another embodiment, one or more booking class inventories may be updated in step 208 based on economic factors, as described further herein, to adjust the fare(s) offered for flight in response to information received about an aircraft. For example, a bid for an aircraft may be updated by a supplier, thus changing the effective cost of flying flights associated with the aircraft. In one embodiment, in response to the updated bid, expected revenues from selling available seats on a flight may be modified through updating a booking class inventory for the flight in step 208 to maintain profitability levels or risk levels for operating that flight or other flights. In another embodiment, in response to a booking of a seat on a flight a management system may modify an expected profitability level and/or a financial risk level for another flight. For example, an aircraft may be committed to fly on a day based on the booking of a seat, and due to the booking may be able to fly other flights on that day at a reduced incremental cost, thereby increasing the profitability level of those flights and/or reducing the risk of offering available seats on those flights at a certain fare. In one embodiment, in response to information related to an aircraft, such as a bid and/or a booking of as seat on a first flight, one or more booking class inventories are updated in step 208 for one or more additional flights in the flight schedule.

In one embodiment, updating a booking class inventory in step 208 is performed along with maintaining relationships between flights. For example, as described further herein, aircraft may be available to fly certain pools of flights that overlap, allowing a first aircraft to fly one flight of a pool of flights and another aircraft to potentially fly other flight(s) in that pool. In response to a bid for an aircraft or a booking of a seat on a flight, the relationships between flights may be managed, updated, and/or maintained, such as through adjusting available seats between booking class inventories for a flight or through adjusting total reservation inventories between flights. For example, an aircraft may be committed to fly a flight and other aircraft may not be available to service potential bookings on other related flights In one embodiment, a booking on a first flight may affect an incremental cost of operating another flight and, in response, one or more booking class inventories of the other flight may be updated in step 208, as described further herein. For example, a booking on a flight leg (e.g., from location A to location B) of a one-stop flight (e.g., from location A to location C) may affect the incremental cost of operating the one-stop flight, and the booking class inventories related to the one-stop flight may be updated in step 208. As another example, a booking on a flight leg (e.g., from location A to location B) that is shared by a one-stop flight (e.g., from location A to location C) may affect aircraft availability, such as committing the only available aircraft to fly from location A to location B and thus a booking class inventory for another flight (e.g., a non-stop flight from location A to location C) will be updated in step 208 to include no available seats.

Figure 3:
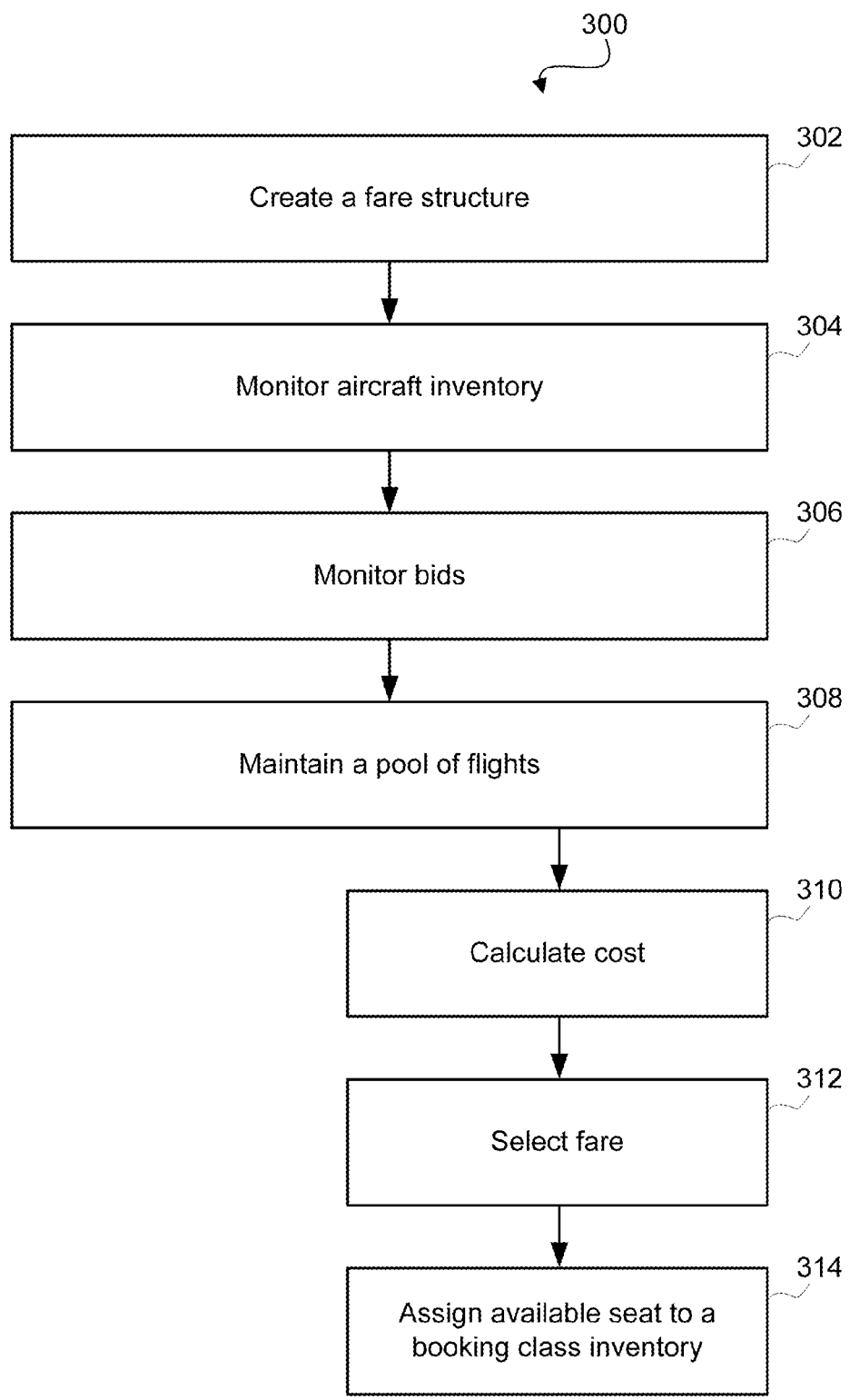
FIG. 3 illustrates an embodiment of a method for interfacing with a computer flight system through maintaining a pool of flights.

FIG. 3 illustrates an embodiment of a method 300 for interfacing with a computer flight system through maintaining a pool of flights. The method 300 includes creating a fare structure in step 302. The fare structure may be created in step 302 to include a range of potential fares, with each fare associated with a particular booking class. For example, as described further herein, a fare structure for a particular flight may have multiple booking classes each with a fare determined to meet one or more economic criteria, such as expected profitability and/or risk levels (e.g., for meeting expected revenue levels). A range of expected fares includes discrete fares assigned to each booking class within the fare structure during the creation of the fare structure in step 302. In one embodiment, one or more discrete fares assigned to booking classes of the fare structure created in step 302 are discrete fare(s) determined from costs of operating a particular flight, such as costs for using the aircraft on the flight. In another embodiment, one or more discrete fares assigned to booking classes of the fare structure created in step 302 are discrete fare(s) determined from costs (e.g., incremental costs) of operating other flights in a flight schedule, such as related flights belonging to a pool of potentially combinable flights (e.g., sharing a flight leg). In another embodiment, one or more discrete fares assigned to booking classes of the fare structure created in step 302 are discrete fare(s) determined from operating costs for operating a management system described herein.

In one embodiment, a fare structure is created in step 302 before a bid or availability information is received for an aircraft capable of flying one of the flights governed by the fare structure. For example, a fare structure may be created in step 302 based on historical trends, anticipated costs, competitive fares for the same or similar routes, transportation options that serve as alternatives to aircraft flights, or other relevant data. In another embodiment, a fare structure is created in step 302 using present bid information and/or availability information relating to an aircraft. For example, a contract with a supplier, such as an existing contract with the supplier related to aircraft that may be available at a later time, may be used to calculate fares to be used in creating a fare structure in step 302.

In one embodiment, a fare structure may be created in step 302 using fares determined to maximize profitability and minimize risk given incomplete information about aircraft availability and costs associated with using the aircraft. For example, a supplier of aircraft may bid for an aircraft and that supplier may be selected as a primary supplier. If that primary supplier later decreases availability through removing an aircraft (e.g., an aircraft not yet committed to fly a flight), a secondary supplier with an available aircraft may be selected as the primary supplier potentially to operate the affected flights. A fare offered for one of the affected flights may then change (e.g., a potential passenger will see the change in selling price for a ticket on the affected flight) from one fare in the fare structure to another fare in the fare structure. As described further herein, a management system may accomplish the fare shift through updating the number of available seats in booking class inventories for the affected flights. As another example, fares may be selected in creating the fare structure in step 302 before any bids are received for aircraft available to fly flights governed by the fare structure.

In one embodiment, fares selected for creating a fare structure in step 302 may reflect business risk factors. For example, the first booking of a ticket for a flight may not cover the full operating cost for that flight. The difference between the revenue of the first booking (e.g., of one or more available seats) and a related operating cost plus margin at least partially establishes a risk level associated with committing to operate the flight with only that first booking. The risk level may be offset by the revenue generated by future bookings on this flight or flights operated by the same aircraft. The risk level may also include the opportunity cost of not flying other flights which may produce additional revenue.

The method 300 includes monitoring an aircraft inventory in step 304. An aircraft inventory may be entirely virtual, owned/controlled by another party (e.g., another supplier) and/or may contain owned/controlled aircraft or aircraft with guaranteed availability. In one embodiment, monitoring an aircraft inventory in step 304 may include tracking inventory as it is adjusted, such as by suppliers submitting, updating and/or withdrawing bids for aircraft and/or availability of aircraft.

The method 300 includes monitoring bids in step 306. As described further herein, bids may include information about an aircraft, including constraints of the aircraft and cost for operating the aircraft. Monitoring bids in step 306 may include receiving bids from a supplier and/or contacting a supplier (e.g., through automated means) for updates to bids. In alternative embodiments, bookings may be monitored, such as through requesting updates on booking information, through receiving information about bookings (described further herein), through communications with a computer flight system, and/or through indirect indications of bookings.

Monitoring aircraft inventory in step 304 and/or monitoring bids in step 306 may be performed through machines or computers such as through monitoring a location in memory for an update or receiving a communication regarding aircraft inventory or bids. For example, information relating to bids or inventories of available aircraft may be stored in data storage elements and referenced as part of the monitoring steps, such as in either step 304 or step 306. Monitoring aircraft inventory in step 304 and/or monitoring bids in step 304 may be performed continually, near continually (e.g., at a hardware polling rate), or periodically.

The method 300 includes maintaining a pool of flights in step 308. In one embodiment, a pool of flights includes a plurality of flights whose reservation inventories are mutually dependent on an inventory of one or more aircraft unit(s), wherein the change of the operating cost or availability of an aircraft unit or a booking on a first flight in the pool may necessitate modifying a reservation inventory of a second flight in the pool. In another embodiment, a pool of flights includes a plurality of independent flights, as described further herein, wherein the flights share no common physical flight leg. In another embodiment, a pool of flights includes the plurality of flights that may be modified due to a change in availability of a particular aircraft unit and/or due to a booking on a first flight. For example, a pool of flights may be maintained in step 308 based on relationships between the flights in the pool and may be performed in response to an updated bid, such as a change in availability information, and/or a booking (e.g., for one of the flights in the pool). As described further herein, a flight within the pool of flights may be classified as a provisional flight, a double provisional flight, and/or a committed flight. In one example, the flight may be a double provisional. In another example, all flights in the pool are categorized as a provisional flight or as a committed flight. Maintaining a pool of flights in step 308 may include modifying the classification of a flight, such as from a provisional flight to a committed flight based on a booking of a seat on that flight.

In one embodiment, maintaining a pool of flights in step 308 includes one or more steps, including calculating a cost in step 310, selecting a fare in step 312, and/or assigning an available seat to a booking class inventory in step 314. Calculating a cost in step 310 may be performed using a number of different types of data, including operating cost data, other cost data (e.g., depreciation), and/or risks of costs changing. In one embodiment, calculating a cost related to a flight in step 310 may only use data related to that flight, such as a cost of operating an aircraft on that flight, the physical capacity of the aircraft, and/or the aircraft's ability to fly other flights. In another embodiment, calculating a cost related to a flight in step 310 uses data related to other flights, as described further herein. For example, a cost for operating a flight may depend on cost data for any other flights connecting to or otherwise related to the flight (such as being potentially combinable). In another embodiment, calculating a cost related to a flight in step 310 may be performed through calculating an incremental cost, such as the cost of serving an additional destination. For example, an incremental cost may be calculated in consideration of the status (e.g., booked, yet to be booked) of a related flights and/or in consideration of costs associated with the related flights. In other embodiments, a cost calculated in step 310 may be an operating cost, an overhead cost, a fixed cost, and/or a variable cost. In some embodiments, calculating a cost in step 310 may be part of determining that a cost has changed. For example, a cost may change due to the change of data on which the cost depends, such as a bid from a supplier. Determining a cost has changed may include calculating a cost in step 310 and may include determining a change in the data on which the cost depends, without an explicit calculating or re-calculating of the cost.

In one embodiment, selecting a fare for a flight in step 312 is performed based on a cost associated with the flight. For example, a fare may be selected from a range of fares in a fare schedule that approximates an incremental cost of carrying a passenger on the flight. For the first booking received for a flight (e.g., of one or more available seats), the incremental cost of servicing that booking (e.g., flying the flight) may be equal to the entire cost of operating the flight, including the cost to operate the aircraft in addition to operating costs for operating the management system, expected return on risked assets, and/or overhead associated with any management system. In addition, margin may be added to an incremental cost for flying a first flight. In one embodiment, a fare is selected in step 312 that matches or approximates the entire cost of operating the flight. In another embodiment, a fare is selected in step 312 that is less than the incremental cost of servicing the next booking on the flight, subjecting the entity that honors the first booking (e.g., an entity operating the management system, a supplier) to financial risk. In one embodiment, a fare is selected in step 312 based on a level of acceptable financial risk for booking available seats at the selected fare.

For subsequent booking(s) received for a flight (e.g., when a second booking is received) or for bookings on flights related as described further herein, the incremental cost for servicing the subsequent booking (e.g., including operating the flight with an additional passenger) may be significantly reduced. In one embodiment, a fare in the fare structure is designated as a "fill fare" and selecting the fare in step 312 is performed by selecting the "fill fare" for any bookings after the first booking. In another embodiment, a fare is selected in step 312 based on increasing profitability for additional seats booked on the flight or based on mitigating risk on a related flight. Relationships between flights that may affect selection of fares in step 312 are described further herein. For example, a fare selected in step 312 may be based on a change in incremental cost due to a potential or actual combination with another flight that is currently committed to operate. As another example, a fare may be selected in step 312 in order to provide additional revenue to offset the risk associated with a first booking on another flight (e.g., including an unrelated flight) that has a large incremental cost associated with committing to a first booking on the other flight. As another example, a fare for a first flight may be selected in step 312 based on a booking on a second flight that is combinable with the first flight.

Assigning an available seat to a booking class inventory in step 314 may be performed based on the fare selected in step 312. For example, as described further herein, a booking class inventory associated with the fare selected in step 312 may be assigned one or more available seats in step 314. As described further herein, updating a booking class inventory, such as assigning a seat to a booking class inventory in step 314, may be performed such that only the one booking class inventory has available seats and that booking class inventory corresponds to the fare selected in step 310.

Figure 4:
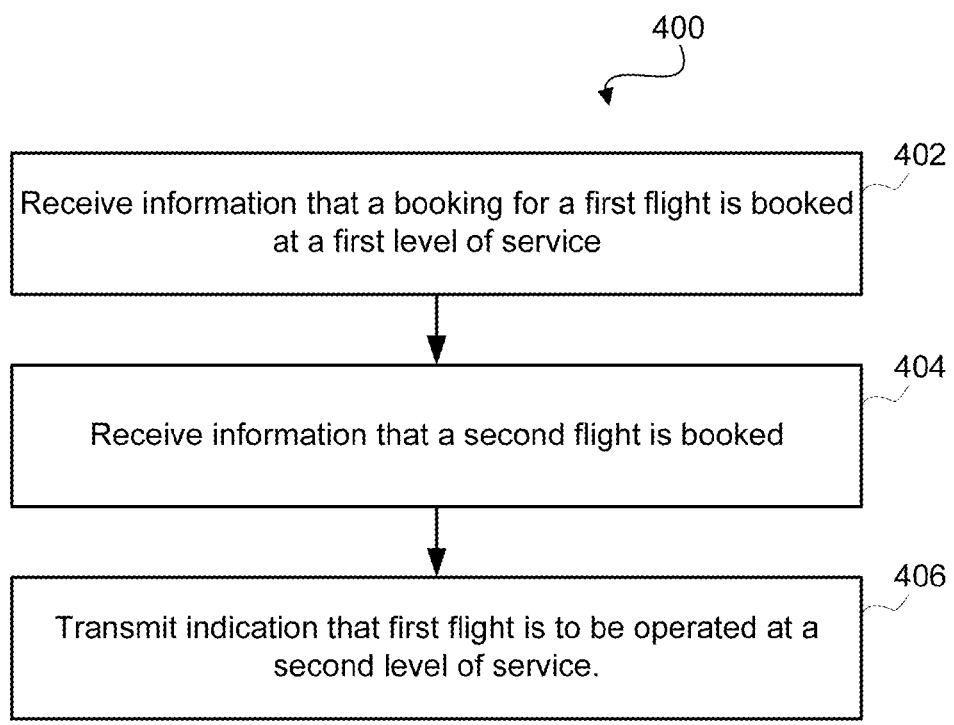
FIG. 4 illustrates an embodiment of a method for interfacing with a computer flight system through modifying levels of service of a future committed aircraft flight.

FIG. 4 illustrates an embodiment of a method 400 for interfacing with a computer flight system through modifying levels of service of a future committed aircraft flight. The method 400 includes receiving in step 402 information that a booking for a first flight is booked at a first level of service. A level of service for a booking may include flight time, a number of stops (including no stops) required for the flight, arrival times (e.g., arriving earlier or later), or other aspects of the flight incorporated in the booking. A level of service may be implicit in the booking, such as an expected flight time between departure and arrival times. A level of service may be explicitly stated, such as a number of stops (including no stops) required for the flight or the type of aircraft used. Therefore, information that a booking has been accepted at a first level of service may be received in step 402 through receiving basic information about the booking and implicitly receiving information about the level of service and/or may be received in step 402 through receiving explicit indications of the level of service associated with the booking.

The method 400 includes receiving information in step 404 that a seat has been booked on a second flight. For example, a computer flight system 106 may provide information about bookings made on flights to outside entities, and a management system, as described further herein, may receive this information in step 404 from the computer flight system, such as over a network. Information received in step 404 may take several forms, such as an indication of a booking, or indirect information from which a booking may be inferred. In one embodiment, the second flight may be combined with a first flight. For example, a second flight may share a common physical flight leg with the first flight. As another example, the second flight may be related to the first flight, such as a connecting flight with the first flight. In another embodiment, the second flight is different from the first flight. For example, the second flight may be unrelated to the first flight.

The method 400 includes transmitting an indication in step 406 that the first flight is to be operated at a second level of service. In one embodiment, the second level of service is superior to the first level of service. For example, the second level of service may provide an earlier arrival time or fewer number of stops between origin and destination. As described further herein, an aircraft or routing of aircraft originally intended to be flown on the first flight may be re-routed and/or re-assigned to another flight and the replacement aircraft or routing for the first flight may be performed at the second level of service.

FIGS. 5-10 show various embodiments for managing a plurality of provisional flights and commitments of aircraft to certain aircraft flights. As described further herein, flight schedules may contain more flights than can be flown by an aircraft inventory that is guaranteed or even known to be available. Flight schedules may contain flights termed "provisional flights" that may or may not be flown and are not yet committed to be flown. Flight schedules may also contain flights termed "double provisional flights" that may or may not be flown and do not have an aircraft at the origin location absent other factors, such as another flight being committed to be flown to the double provisional flight's origin location. Other flights in a flight schedule may be committed to be flown, such as after a flight has a booking for a seat on the flight.

As described further herein, booking class inventories may be updated (e.g., through communicating with a computer flight system) in order to modify the fare at which a ticket for a particular flight is offered to be sold. For each provisional flight, available seats for a booking class may be offered for sale at a fare selected as described further herein. Reservation inventories on provisional flights may include available seats in one or more booking class inventories, seats which may be removed after an aircraft is committed to fly another flight. For example, if either of two flights may be flown by one aircraft, but that aircraft may not fly both flights, both flights may be classified as provisional flights and may have reservation inventories with available seats. In response to a booking on one of the flights, if there is no other aircraft that can fly the second flight, the reservation inventory for the second flight may be modified to indicate zero available seats across all booking class inventories. As described further herein, bids, bookings, availability information, and/or other information about an aircraft may cause certain booking class inventories to be modified to zero while one or more booking class inventories remain with available seats, or are modified to add an available seat. However, in situations where the booking of one flight depletes the aircraft availability such that there is not an aircraft available to fly another flight, all the booking class inventories for the other flight will be reduced to zero, thereby closing that other flight to bookings. Additional aircraft that could fly the flight may be available or become available, and additional seats may be added to the reservation inventory for the flight based on the additional aircraft, subject to the selection of fare associated with the booking class(es) and profitability/cost analyses described further herein. For example, if an additional aircraft is already known to be available and could fly a flight, such as an aircraft that has not been selected as a primary option for flying the flight, seats may be added/subtracted from the reservation inventory for the flight to match the capacity of the additional aircraft and available seats may be allocated from one booking class inventory to another booking class inventory based on costs of the additional aircraft, as described further herein. Additional available aircraft may thereby keep a flight open for bookings, potentially at a new fare level for the newly-available seats.

Certain relationships between provisional flights, double provisional flights, and committed flights may be based on the capabilities of aircraft inventories to fly the flights. For example, a pool of flights may include flights that may be flown by a plurality of aircraft and may include in the pool of flights provisional, double provisional and committed flights. In a pool of flights, relationships between the flights may be maintained, as described further herein, through updating one or more reservation inventories for the flights within the pools, and thereby modifying which flights have available seats and/or which fares are offered for the available seats, such as through allocating the available seats between one booking class inventory and another booking class inventory.

Various scenarios are presented for managing a pool of flights including provisional flights in FIGS. 5-10 with a simplifying assumption that only one aircraft is available to fly all of the flights. Therefore, based on a booking for a flight within the pool of flights, certain other flights in the pool may have their reservation inventories reduced to zero available seats and therefore may be closed for sale. Flights are referred to in FIGS. 5-10 by their physical flight legs between locations in order to clarify the routing of the flights shown in each scenario. Flights may be referred to in a flight schedule by the individual flight legs and/or as flights, such as one-stop flights or multiple-stop flights.

Figure 5:
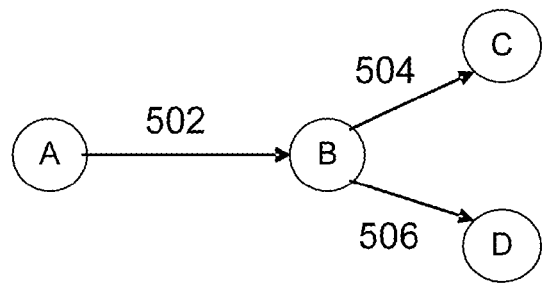
FIGS. 5-10 show various embodiments for managing a plurality of provisional flights and commitments of aircraft to certain aircraft flights.

FIG. 5 illustrates a scenario of a committed flight leg 502 connecting to two provisional flight legs 504 and 506. Presuming that there are available seats on committed flight leg 502, booking classes for each flight leg initially have available seats and bookings with origin/destination pairs AB, AC, AD, BC, and BD may be offered for sale. If either provisional flight leg 504 or provisional flight leg 506 has a seat booked, then the other provisional flight leg must have all available seats removed from its booking class inventories.

Figure 6:
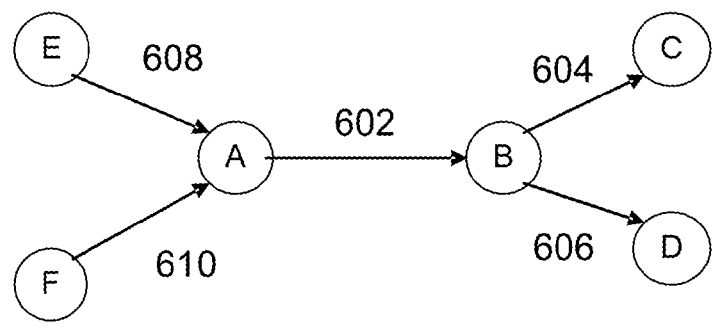

FIG. 6 illustrates a scenario of a committed flight leg 602 connecting to two provisional flight legs 608 and 610 at location A and connecting to two provisional flight legs 604 and 606 at location B. Presuming that there are available seats on flight leg 602, reservation inventories for flight legs initially have available seats for origin/destination pairs AB, AC, AD, BC, and BD may be offered for sale for booking classes with fares selected as described further herein. If either provisional flight leg 604, or 606 has a seat booked, then the other provisional flight leg must have all available seats removed from its reservation inventory (e.g., removing all available seats from all booking class inventories). Presuming that there is an aircraft available to originate from location E and/or location F (e.g., one or more additional available aircraft), reservation inventories for flight legs may initially have available seats with origin/destination pairs EA, EB, EC, ED, FA, FB, FC, FD, AB, AC, AD, BC, and BD and both reservation inventories for the respective flight legs and booking class inventories for each flight may be determined with respect to bids, bookings and/or costs as described further herein.

Figure 7:
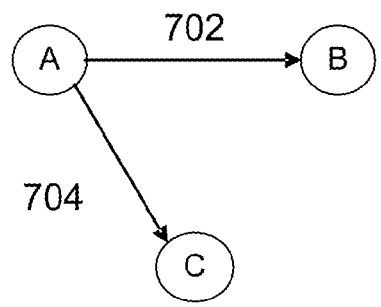

FIG. 7 illustrates a scenario of two provisional flight legs 702 and 704 originating at location A. Reservation inventories for each provisional flight leg initially have available seats with origin/destination pairs AB and AC that may be offered for sale through various booking class inventories as described further herein. If either provisional flight leg 702 or 704 has an available seat booked, then the other provisional flight leg must have all available seats removed from its reservation inventory (e.g., removing all available seats from all booking class inventories).

Figure 8:
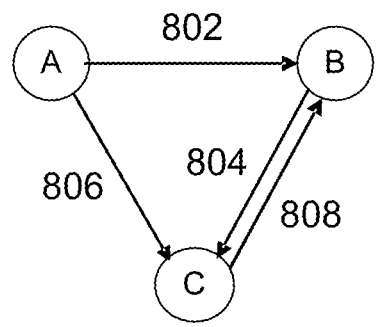

FIG. 8 illustrates a scenario of a provisional flight leg 802 originating from location A and flying to location B and a provisional flight leg 806 originating from location A and flying to location C. Double provisional flight legs 804 and 808 initially may not have available seats in their reservation inventories, as described further herein. At least one booking class inventory for provisional flight legs 802 and 806 initially has available seats. As described further herein, flight legs may be combined and listed in a flight schedule as one-stop or multiple-stop flights. In one embodiment, a non-stop flight between an origin and a destination may have assigned a different flight number and/or a different routing number from a one-stop flight between the origin and the destination. For example, while non-stop bookings from location A to location B may be offered on flight leg 802 through a first flight number, a one-stop booking may also be offered from location A to location B on a second flight number through a combination of flight leg 806 and flight leg 808. In one embodiment, the booking for a one-stop flight from location A to location C is offered at a different price than the price for a non-stop booking. As described further herein, a non-stop booking on flight leg 802 may result in removing all available seats from the reservation inventory of the non-stop flight from location A to location C, and removing all available seats from the one-stop flight from location A to location B, such as when a booking on flight leg 802 results in commitment of the only aircraft available to fly flight legs 806 and 808.

With a single presumed aircraft available to originate from location A, a management system may determine that it is undesirable, not cost-effective, or otherwise unworkable to fly the aircraft between locations B and C on flight legs 804 or 808 without a first booking of one or more seats on flight leg 802 or 806. For example, a management system may determine that it may be undesirable or not cost-effective to fly an aircraft from location A to location B with no booked seats along flight leg 802 in order thereafter to service a flight leg 804 from location B to location C. In one embodiment, the reservation inventories for double provisional flight legs 804 and 808 initially have no available seats (e.g., in any booking class inventory). In another embodiment, double provisional flight legs 804 and/or 808 are not included in a flight schedule sent to a computer flight system until a booking is received on flight leg 802 or 806.

Figure 9:
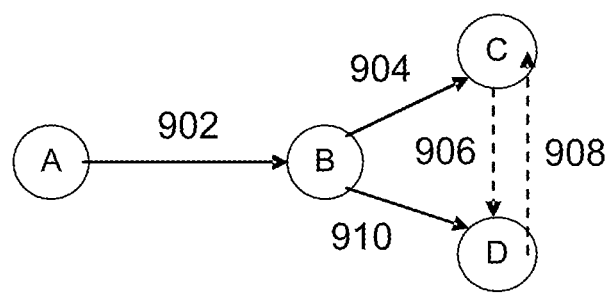

FIG. 9 illustrates a scenario of a committed flight leg 902 connecting to two provisional flight legs 904 and 910, with double provisional flight legs 906 and 908. Presuming that there are available seats on committed flight leg 902, reservation inventories for flight legs 902, 904 and 910 initially have available seats. As described further herein, in various embodiments, double provisional flight legs 906 and 908 (shown as dashed lines) may not be part of a flight schedule sent to a computer flight system until the double provisional flight leg is reclassified as a provisional flight leg and a reservation inventory with available seats is created for it. For example, in embodiments without double provisional flight legs 906 and 908 included in the flight schedule, the scenario is similar to that shown in FIG. 5. In other embodiments, double provisional flight legs 906 and 908 are part of a flight schedule but available seats may be allocated to their reservation inventories only after there is at least one booking on one of the provisional flight legs 904 or 910. For example, bookings on double provisional flight leg 906 may be offered for sale only after at least one booking on flight leg 904 has been received or after an available aircraft is committed to be at location C.

Figure 10:
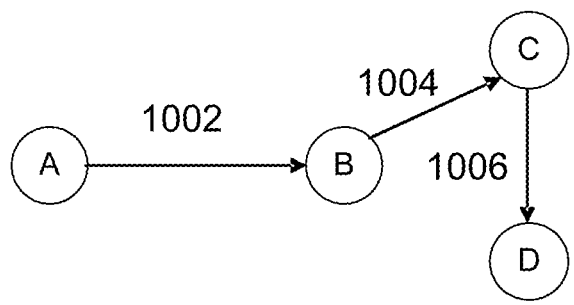

FIG. 10 illustrates a scenario similar to that of FIG. 9 wherein a booking was made for a flight that includes flight leg 1004 (e.g., one-stop flight from location A to location C including flight legs 1002 and 1004), thereby reclassifying flight leg 1004 as a committed flight leg and committing the assumed single aircraft to fly from location B to location C. Based on this commitment, the original provisional flight leg from location B to location D must now route through location C as a one-stop flight with two flight legs 1004 and 1006. (Original provisional flight leg from location B to location D is shown in FIG. 9 as flight leg 910, but it has been removed from FIG. 10 based on the presumed commitment.) As described further herein, this may result in updates to booking class inventories for a flight from location B to location D, such as based on changes in determined costs for that flight, as described further herein.

FIG. 11 is schematic representation of an embodiment of a computer system for interfacing with a computer flight system. System 1100 includes a machine 1102 (e.g., computer) that is connected to a network 1104 and that includes a processor 1106, a display 1108, a storage 1110, and an interface module 1112. Machine 1102 may also include, for example, another storage in addition to storage 1110, such as a memory (e.g., volatile, nonvolatile), a power supply unit, a real-time clock, a hard disk drive, and/or a network interface card (NIC). Interface module 1112 may include or be adapted to work with display 1108, and may further include an input/output unit, a keyboard, and/or a pointing device (e.g., for controlling a cursor). Machine 1102 may connect to network 1104, which may include the Internet, a portion of the Internet, a local area network (LAN), which may or may not have connections to the Internet, a wide area network (WAN), a wireless wide area network (WWAN) or other networks. The network 1104 may also include a wired network, power-line network, radio, wireless, 802.11 network, infrared network, ultrasound network, etc. The network 1104 may be implemented using compatible technologies for communicating electronically with any other systems described herein as well as any parts of those systems. Many other devices and modifications that are well known may be used instead of, or in addition to, the components shown of system 1100, without departing from the broader spirit and scope of the description herein.

In one embodiment, the management system 104 described further herein may be implemented using system 1100 or a variation of the system to carry out its functions. In several embodiments, suppliers 102, also described herein, may use a system 1100 or a variation of the system to carry out the functions of the suppliers and/or to communicate with the management system 104. In several embodiments, computer flight systems 106 may be implemented using a system 1100 or a variation of the system.

The system 1100 includes a content storage 1114 connected to the network 1104. In one embodiment, the data storage 1114 is a public or semi-public online repository of information relating to aircraft. For example, a data storage 1114 may contain information from suppliers such as bids and aircraft availability and access may be limited so that certain suppliers may access only certain types of data, such as data relating to the supplier's bids and the bids of other suppliers. In another embodiment, the data storage 1114 is a private or proprietary storage of information relating to aircraft. For example, a private storage may store historical data relating to bids and costs, supplier's physical inventory of aircraft, or other data for use by a management system as described further herein.

In one embodiment, the data storage 1114 is used by the machine 1102 via connecting through the network 1104 in performance of the methods described further herein. In one embodiment, additional machines 1116*a* and 1116*b* perform some of the processes and/or run some of the programs described herein. For example, calculations of cost(s) and/or risk(s) in support of maintaining relationships between flights and processing necessary updates to booking class inventories. In another embodiment, additional machines 1116*a* and 1116*b* may be used to access, control or operate a management system, as described further herein.

Descriptions of methods herein may be implemented in software, firmware, hardware and/or in any combination thereof. For example, methods may be implemented in hardware, such as computers (e.g., general purpose machines, embedded computing machines). Descriptions of apparatus or systems herein may be implemented in software, firmware, hardware and/or in any combination thereof. For example, systems may be implemented as virtual machines in software. Communication connections described further herein may be implemented in any form of communications technology or combination thereof, such as, for example, hardware bus, Internet Protocol (IP) connections, and/or proprietary connections. For example, in this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface).

The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions that may be executed by processors.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the figures illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that certain operations could be implemented in hardware, firmware, software or any combination thereof.

It is clear that many modifications and variations of this embodiment can be made by one skilled in the art without departing from the spirit of the novel art of this disclosure. For example, the systems and method herein disclosed can be applied to many different reservations systems. Also, while specific reference to aircraft flight reservations may have been disclosed, other transportation reservations or other reservations may also be used. These modifications and variations do not depart from the broader spirit and scope of the present disclosure, and the examples cited here are illustrative rather than limiting.

What is claimed is:

1. A method, comprising:
storing availability data for a plurality of aircraft, each capable of operating at least one flight in a flight schedule;
publishing the flight schedule to a computer flight system that allows users of the computer flight system to purchase available seats from a plurality of flights contained in the published flight schedule, the plurality of flights including a number of flights that is greater than a number of possible flights that may be flown by the plurality of aircraft;
receiving an indication of a booking on a first aircraft flight of the plurality of flights;
determining, via a data processing system, that the booking causes a change in an availability for an aircraft of the plurality of aircraft capable of operating a second aircraft flight of the plurality of flights in the published flight schedule that has no prior bookings; and
instructing the computer flight system to modify an operational status of the second aircraft flight while the second aircraft flight is in the published flight schedule in order that the second aircraft flight will not operate via instructing the computer flight system to remove all available seats from the second aircraft flight.

2. The method of claim 1, further comprising creating, via the data processing system, the flight schedule prior to receiving the indication.

3. The method of claim 1, further comprising creating a fare structure related to the second aircraft flight, the fare structure including a range of costs for operating the second aircraft flight.

4. The method of claim 1, wherein the instructing is performed further based on the change in availability.

5. The method of claim 1, further comprising:
calculating, via the data processing system, a cost to operate the second aircraft flight of the plurality of flights based on the booking;
wherein the instructing step is performed further based on the cost.

6. The method of claim 5, wherein the calculating the cost is further based on the change in availability.

7. The method of claim 1, further comprising determining, via the data processing system, based on the indication, that a cost has changed for operating the second aircraft flight, wherein the instructing is performed based further on the change in cost.

8. The method of claim 1, wherein the first aircraft flight and the second aircraft flight share no physical flight leg.

9. The method of claim 1, further comprising maintaining information about a relationship between a cost of operating an aircraft related to the first aircraft flight and a booking class inventory for the second aircraft flight.

10. The method of claim 1, further comprising maintaining information about a relationship between the booking on the first aircraft flight and a booking class inventory for the second aircraft flight.

11. A non-transitory computer-readable medium storing computer-readable instructions, which when executed, cause a system to:
publish a flight schedule to a computer flight system that provides users with access to purchase available seats from a plurality of flights, the published flight schedule containing the plurality of flights with a number of flights that is greater than a number of possible flights that may be flown by a plurality of aircraft stored in the system;
receive an indication of a booking on a first aircraft flight of the plurality of flights;
determine, by a processor, that the booking causes a change in availability of an aircraft of the plurality of aircraft capable of operating a second aircraft flight of the plurality of flights in the published flight schedule that has no prior bookings; and
instruct the computer flight system to modify an operational status of the second aircraft flight in the published flight schedule in order that the second aircraft flight will not operate via instructing the computer flight system to remove all available seats from the second aircraft flight.

12. The storage medium of claim 11, wherein the instructions further cause the system to instruct the computer flight system further based on the change in availability.

13. The storage medium of claim 11, wherein the instructions further cause the system to:
calculate, based on the booking, a cost to operate the second aircraft flight of the plurality of flights;
wherein the computer flight system is instructed to modify an operational status of the second aircraft flight based on the cost.

14. A data processing system, comprising:
at least one processor; and
memory for storing an indication of a booking on a first aircraft flight and a cost to operate a second aircraft flight, wherein the memory stores instructions configured to instruct the at least one processor to:
publish a flight schedule to a computer flight system that provides users access to purchase available seats from a plurality of flights, the published flight schedule containing a plurality of flights with a number of flights that is greater than a number of possible flights that may be flown by a plurality of aircraft stored in the memory;
receive the indication of the booking on the first aircraft flight of the plurality of flights;
determine that the booking causes a change in availability of an aircraft capable of operating a second aircraft flight of the plurality of flights in the published flight schedule that has no prior bookings; and
instruct, based on the cost, the computer flight system to modify an operational status of the second aircraft flight in order that the second aircraft flight will not operate via instructing the computer flight system to remove all available seats from the second aircraft flight in the published flight schedule.

15. The data processing system of claim 14, wherein the instructions to the computer flight system are further based on the change in availability.

16. The data processing system of claim 14, wherein the instructions further instruct the at least one processor to:
calculate the cost to operate the second aircraft flight of the plurality of flights based on the booking;
wherein the computer flight system is instructed to modify an operational status of the second aircraft flight based on the cost.

* * * * *